(12) United States Patent
Todd et al.

(10) Patent No.: US 8,317,260 B1
(45) Date of Patent: Nov. 27, 2012

(54) REAR SEAT EXTENSION DEVICE FOR MOTORCYCLES

(76) Inventors: Brian J. Todd, Garden Grove, CA (US); Don E. Todd, Garden Grove, CA (US)

( * ) Notice: Subject to any disclaimer, the term of this patent is extended or adjusted under 35 U.S.C. 154(b) by 38 days.

(21) Appl. No.: 12/964,364

(22) Filed: Dec. 9, 2010

(51) Int. Cl.
*B62J 1/18* (2006.01)

(52) U.S. Cl. .............................. 297/215.11; 297/219.11

(58) Field of Classification Search ............ 297/195.13, 297/215.1, 215.11, 219.11
See application file for complete search history.

(56) References Cited

U.S. PATENT DOCUMENTS

| | | | |
|---|---|---|---|
| 3,940,166 A * | 2/1976 | Smithea ................... 297/215.11 |
| 4,779,924 A | 10/1988 | Rudel |
| 5,322,345 A | 6/1994 | Desser et al. |
| 5,553,915 A * | 9/1996 | Stamatakis ............... 297/195.13 |
| 5,575,528 A * | 11/1996 | Netz ...................... 297/219.11 X |
| 5,697,671 A * | 12/1997 | Shavitz ..................... 297/214 X |
| 5,713,629 A | 2/1998 | Plackis |
| D412,867 S | 8/1999 | White |
| 6,481,792 B1 | 11/2002 | Goin |
| 6,971,715 B2 | 12/2005 | Hankins |
| 7,111,903 B1 | 9/2006 | Snelson |
| 2008/0217969 A1* | 9/2008 | Mills ......................... 297/215.1 |

\* cited by examiner

*Primary Examiner* — Anthony D Barfield

(57) ABSTRACT

A rear seat extension device for attaching to a motorcycle featuring a cushion component having a top surface, a bottom surface, a front surface, and a back surface, wherein the bottom surface of the cushion component is curved inwardly to provide the cushion component with a good fit atop a main seat of the motorcycle; an attachment strap extending from the back surface of the cushion component; and one or more mounting holes disposed in a second end of the attachment strap, the attachment strap is for placing underneath a rear seat of the motorcycle such that the mounting hole is placed over a prong disposed underneath the rear seat.

7 Claims, 3 Drawing Sheets

REAR SEAT EXTENSION DEVICE FOR MOTORCYCLES

FIELD OF THE INVENTION

The present invention is directed to a cushion for a seat of a motorcycle, more particularly to a cushion for extending the rear seat of a motorcycle.

BACKGROUND OF THE INVENTION

Sitting behind the driver of a motorcycle can be uncomfortable, and in some cases dangerous. The present invention features a rear seat extension device for attaching to a motorcycle to extend the length of the rear seat of the motorcycle and provide additional comfort to a rear passenger. The rear seat extension device of the present invention allows the rear passenger to sit closer to the driver, which provides the rear passenger additional comfort and stability.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
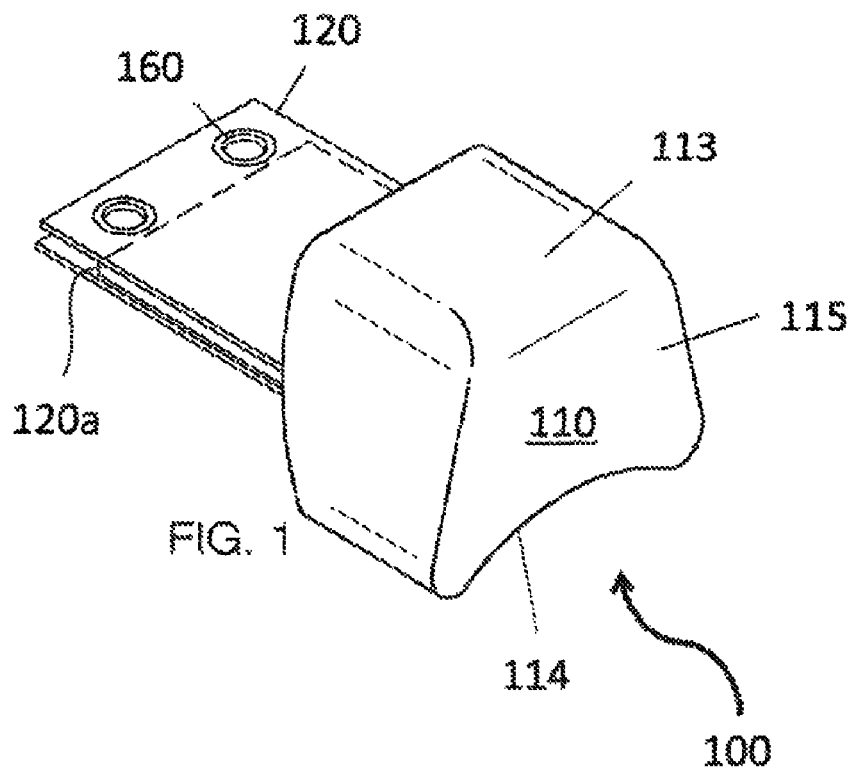
FIG. 1 is a perspective view of the rears seat extension device of the present invention.
Figure 2:
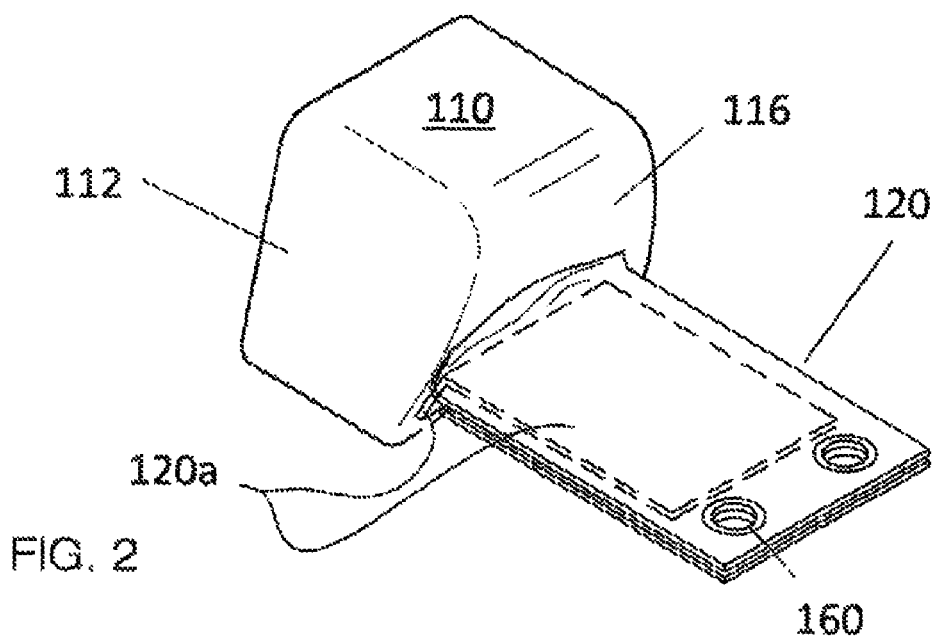
FIG. 2 is a perspective view of the rears seat extension device of FIG. 1.
Figure 3:
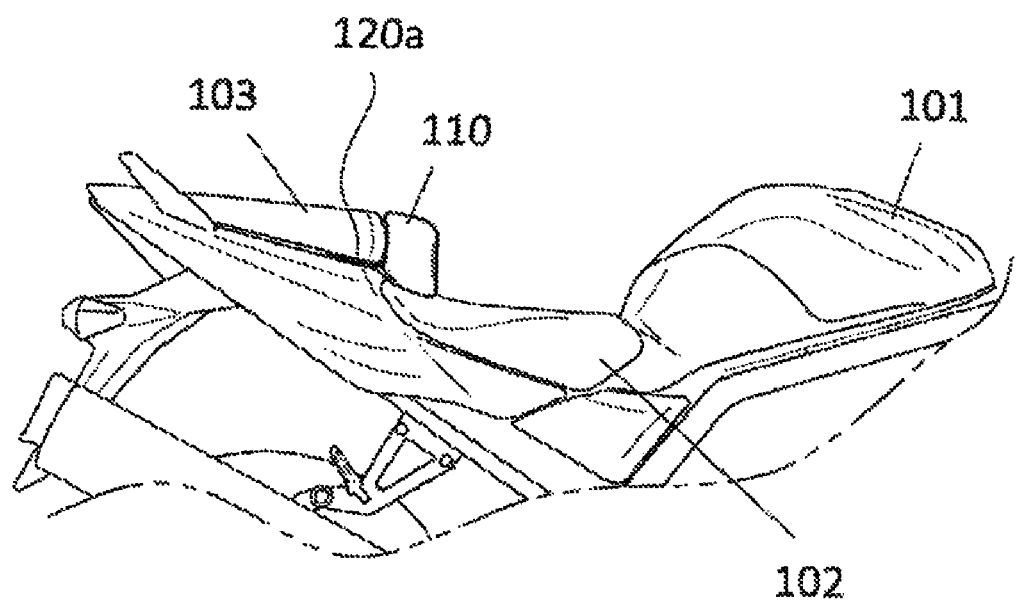
FIG. 3 is a side view of the rears seat extension device of FIG. 1 as attached to a motorcycle.
Figure 4:
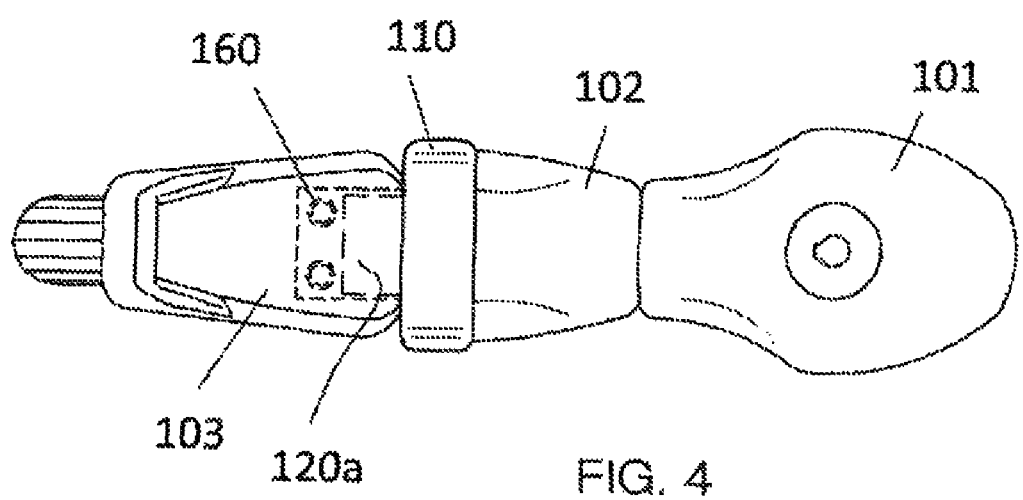
FIG. 4 is a top view of the rears seat extension device of FIG. 1 as attached to a motorcycle.
Figure 5:
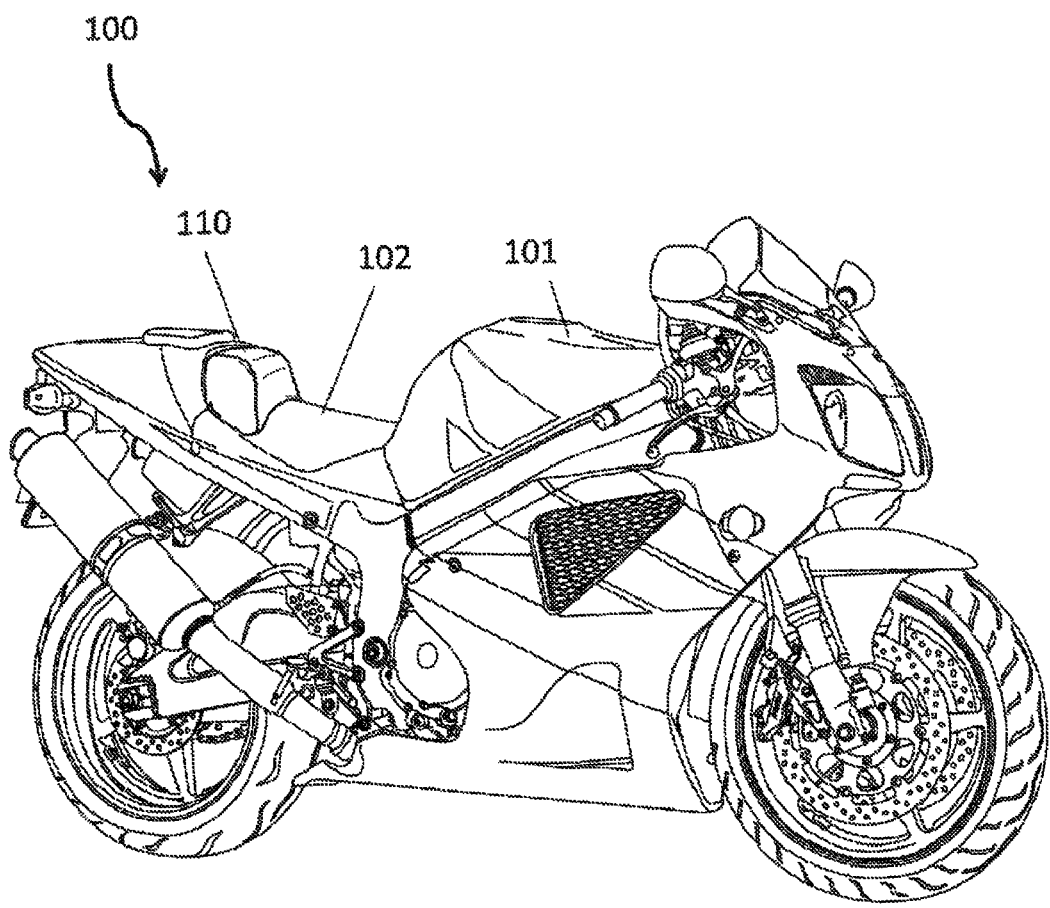
FIG. 5 is a perspective view of the rears seat extension device of FIG. 1 as attached to a motorcycle.

Referring now to FIGS. 1-5, the present invention features a rear seat extension device 100 for attaching to a motorcycle 101. The rear seat extension device 100 of the present invention extends the length of the rear seat 103 of the motorcycle 101 and can provide additional comfort to a rear passenger. Without wishing to limit the present invention to any theory or mechanism, it is believed that the rear seat extension device 100 of the present invention is advantageous because it allows the rear passenger to sit closer to the driver, which provides the rear passenger additional comfort and stability.

The rear seat extension system 100 of the present invention comprises a main seat 102 on a motorcycle, a rear seat 103 behind the main seat 102 and on the rear of a motorcycle, and a cushion component 110. The cushion component 110 may be generally cube-shaped having a first side, a second side 112, a top surface 113, a bottom surface 114, a front surface 115, and a back surface 116. Extending from the back surface 116 of the cushion component 110 is an attachment strap 120. The attachment strap 120 has a first end and a second end, wherein the first end is attached to the back surface 116 of the cushion component 110. Disposed in the second end of the attachment strap 120 is one or more mounting holes 160.

Disposed in the attachment strap 120 is a brace 120a. The brace 120a functions to help prevent the rear seat extension device 100 from shifting side to side. In some embodiments, the brace 120a spans all or a portion of the attachment strap (shown in FIG. 2), or in some embodiments, the brace 120a may extend into the cushion component 110 (not shown). In some embodiments, the brace 120a is a generally flat panel (e.g., solid flat panel) that fits in the attachment strap 120. In some embodiments, the attachment strap 120 is tucked underneath the rear seat 103 so that the cushion component 110 rests on top of the main seat 102.

The cushion component 110 is for placing (e.g., removably attaching) atop a main seat 102 of a motorcycle 101, for example the bottom surface of the cushion component 110 is placed atop the main seat 102. The back surface 116 of the cushion component 110 is pushed against the rear seat 103 of the motorcycle 101 (e.g., the device 100 is positioned at the very back of the main seat 102 of the motorcycle 101). In some embodiments, the bottom surface of the cushion component 110 is curved inwardly. The inward curve may provide the cushion component 100 with a good fit atop the main seat 102 of the motorcycle 101. Generally, when the cushion component 110 is placed atop the main seat 102, the top surface of the cushion component 110 is flush with the rear seat 103 of the motorcycle.

The attachment strap 120 is placed underneath the rear seat 103 of the motorcycle, and the mounting holes 160 are placed over the prongs disposed underneath the rear seat 103. (In some embodiments, only one mounting hole 160 is present, for example for use on a motorcycle with a single prong under the rear seat 103.) The prongs are standard features of a rear seat. Thus, the device 100 of the present invention can easily be attached to the motorcycle 101 without the need for additional hardware.

The device 100 of the present invention helps to fill space that may occur between the driver and the rear passenger. The device 100 provides a forward extension of the rear seat for the rear passenger. This enables the rear passenger to slide forwardly to better grip the driver while riding.

The cushion component 110 may be constructed in a variety of materials and in a variety of sizes. In some embodiments, the cushion component 110 is constructed from a material comprising foam, cotton, linen, batting, the like, or a combination thereof. In some embodiments, the cushion component 110 is between about 2 to 4 inches in height as measured from the top surface to the bottom surface. In some embodiments, the cushion component 110 is between about 4 to 6 inches in height as measured from the top surface to the bottom surface. In some embodiments, the cushion component 110 is more than about 6 inches in height.

In some embodiments, the cushion component 110 is between about 2 to 4 inches in length as measured from the front surface 115 to the back surface 116. In some embodiments, the cushion component 110 is between about 4 to 6 inches in length as measured from the front surface 115 to the back surface 116. In some embodiments, the cushion component 110 is more than about 6 inches in length.

As used herein, the term "about" refers to plus or minus 10% of the referenced number. For example, an embodiment wherein the cushion component 110 is about 6 inches in height includes a cushion component 110 that is between 5.4 and 6.6 inches in height.

The following the disclosures of the following U.S. Patents are incorporated in their entirety by reference herein: U.S. Pat. No. 5,713,629; U.S. Pat. No. 5,697,671; U.S. Pat. No.

5,322,345; U.S. Pat. No. 4,779,924; U.S. Pat. No. 6,971,715; U.S. Pat. No. 6,481,792; U.S. Pat. No. 7,111,903; U.S. Pat. No. 5,553,915.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A rear seat extension system 100 that attaches to a motorcycle, said rear seat extension system comprises:
   (a) a main seat 102 disposed on the motorcycle;
   (b) a rear seat 103 disposed behind the main seat on the motorcycle;
   (c) a cushion component 110 having a top surface 113, a bottom surface 114, a front surface 115, and a back surface 116, wherein the bottom surface 114 of the cushion component 110 is curved inwardly to provide the cushion component 110 with a good fit atop the main seat of a motorcycle;
   (d) an attachment strap 120 extending from the back surface 116 of the cushion component 110, wherein the attachment strap 120 is tucked underneath the rear seat 103, and wherein the cushion component 110 is disposed on top of the main seat 102;
   (e) a generally flat brace 120a disposed in the attachment strap 120, the brace 120a functions to help prevent the rear seat extension device 100 from shifting side to side; and
   (f) one or more mounting holes 160 disposed in a second end of the attachment strap 120, the attachment strap 120 is for placing underneath a rear seat of the motorcycle such that the mounting hole 160 is placed over a prong disposed underneath the rear seat;
wherein the brace 120a extends into the cushion component 110.

2. The rear seat extension of claim 1, wherein the cushion component 110 is generally cube-shaped.

3. The rear seat extension of claim 1, wherein the cushion component 110 is between about 2 to 4 inches in height as measured from the top surface 113 to the bottom surface 114.

4. The rear seat extension of claim 1, wherein the cushion component 110 is between about 4 to 6 inches in height as measured from the top surface 113 to the bottom surface 114.

5. The rear seat extension of claim 1, wherein the cushion component 110 is between about 2 to 4 inches in length as measured from the front surface 115 to the back surface 116.

6. The rear seat extension of claim 1, wherein the cushion component 110 is between about 4 to 6 inches in length as measured from the front surface 115 to the back surface 116.

7. The rear seat extension of claim 1, wherein the brace 120a spans all or a portion of the attachment strap 120.

\* \* \* \* \*